July 3, 1956     S. POLESCHUK     2,753,043
EXTRUSION PRESS

Filed Feb. 7, 1955     6 Sheets-Sheet 1

INVENTOR.
STEPHEN POLESCHUK
BY
W. B. Harpman
ATTORNEY

INVENTOR.
STEPHEN POLESCHUK
BY
W.B.Hampman
ATTORNEY

United States Patent Office 2,753,043
Patented July 3, 1956

2,753,043

EXTRUSION PRESS

Stephen Poleschuk, Youngstown, Ohio, assignor to Youngstown Foundry & Machine Company, Youngstown, Ohio, a corporation of Ohio Application February 7, 1955, Serial No. 486,505

9 Claims. (Cl. 207—2)

This invention relates to means for extruding metal and more particularly to an improved butt shear, die slide and gate lock construction therein.

The principal object of the invention is the provision of an extrusion press having an internally mounted, fully guided and rigidly maintained butt shear.

A further object of the invention is the provision of an extrusion press having a step-type split gate lock engageable against the die slide of the extrusion press to exactly position the die slide and tools therein.

A still further object of the invention is the provision of an extrusion press incorporating an internally mounted and fully guided butt shear arranged to avoid cylinder rod deflection in the actuating means of the shear and to employ a shorter stroke cylinder thereby contributing to longer cylinder life and simplified mounting thereof.

A still further object of the invention is the provision of an extrusion press in which the butt shear is incorporated into and completely enclosed by the housing which holds the die slide thereby providing full guidance of the butt shear throughout its stroke.

In the extrusion of continuous shapes it is necessary to exclude from the metal being extruded those portions of the billets containing impurities or metal otherwise undesirable for use and butt shears are accordingly incorporated in extrusion presses for shearing off such undesirable portions of the billet.

Extrusion presses heretofore known in the art have utilized a slide to carry the tools and have provided means to positively position the slide during an extrusion operation. Such extrusion presses have utilized conventional gate locks which close for extrusion and open for traversing of the slide from extrusion position to an external shear position. The difficulty involved is that of timing, positioning and control with the externally mounted butt shear and the necessity of relatively long and objectionable time cycle to achieve the shearing operation.

Other extrusion presses known in the art have utilized internally mounted butt shears which function with a conventional type of gate lock. In such presses, the slide is not moved but the container which holds the billet being extruded is shifted away from the tools on the slide to provide space in which the butt shear may operate. The principal difficulty with such constructions is extreme cylinder rod deflection and difficult cylinder mounting problems because of combined deflection and shear, which constructions usually require the use of specially designed actuating cylinders for the respective parts.

In the present disclosure the several difficulties attendant in the operation of butt shears in extrusion presses are eliminated and a construction is disclosed which may be operated in an unusually efficient manner and in a much shorter time cycle than has heretofore been believed possible.

Additionally, the improved butt shear and the associated portions of the extrusion press are so formed that only a minimum amount of movement of the associated portions is necessary to permit rapid and efficient short travel operation of the improved butt shear.

The improved butt shear construction in an extrusion press disclosed herein provides unusual rigidity of the shear blade and a very fast travel time in a shearing operation. The efficiency of operation and the extremely fast time cycle of the shearing operation is particularly good in an extrusion operation utilizing a spider-type hollow die.

With the foregoing and other objects in view which will appear as the description proceeds, the invention resides in the combination and arrangement of parts and in the details or construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
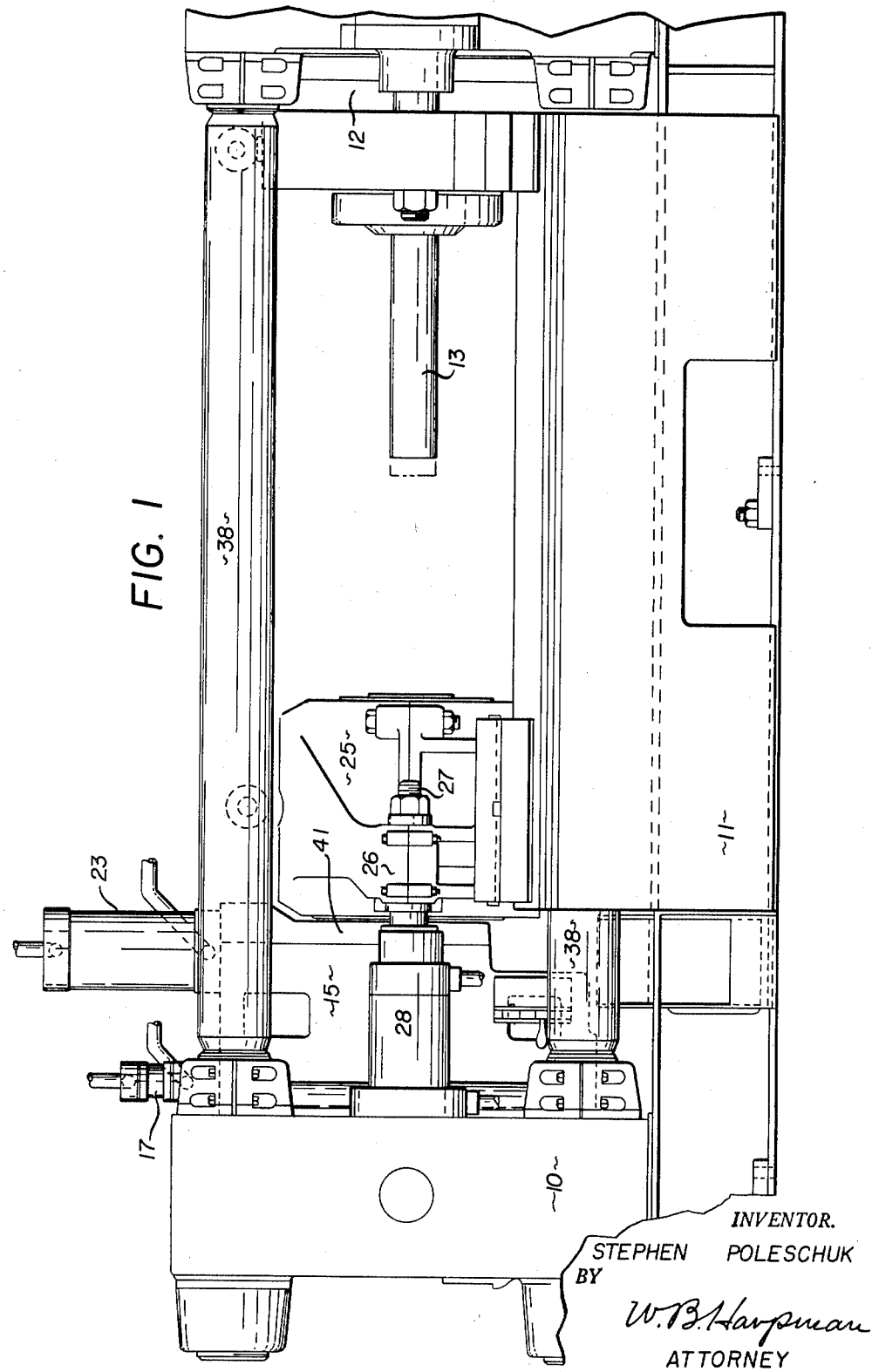
Figure 1 is a side elevation of a portion of an extrusion press.
Figure 2:
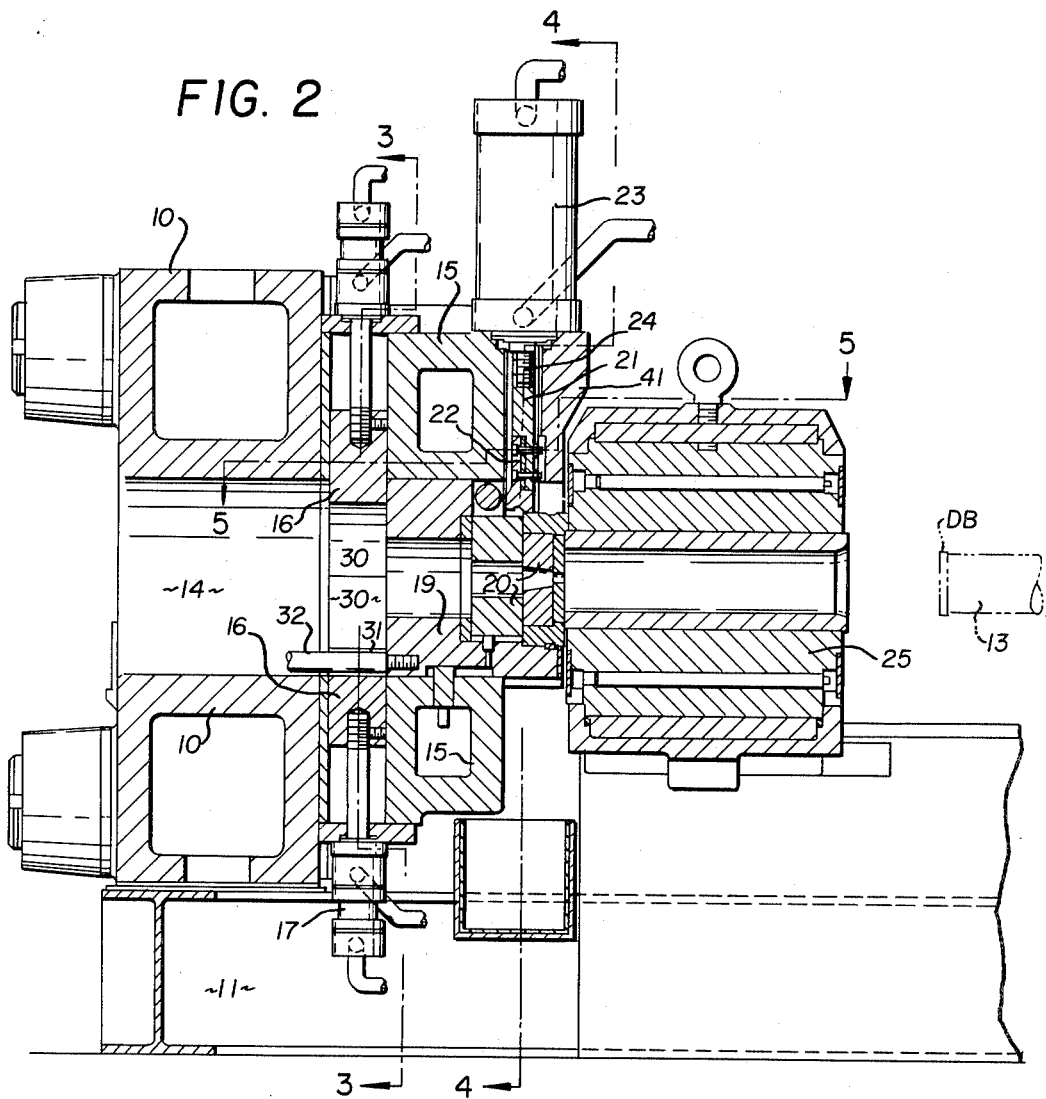
Figure 2 is a vertical section through a portion of the extrusion press shown in Figure 1.

By referring to the drawings and Figures 1 and 2 in particular it will be seen that an extrusion press has been disclosed which includes a platen 10 mounted on one end of a base frame 11 in oppositely disposed relation to a cylinder 12 and ram 13. The platen 10 defines a delivery opening 14 through which extruded metal passes. A housing 15 is positioned adjacent the platen 10 and secured thereto and serves to position and mount a split gate lock 16, the two portions of which are vertically movable in opposed relation by means of actuating cylinders 17—17 and their associated rods 18—18. The gate lock 16 is thereby movable vertically into and out of a horizontal passageway in the housing 15 in which a die slide 19 is located for horizontal reciprocal movement into and out of the area usually occupied by the gate lock 16. The die slide 19 carries extrusion tools 20 which are removably secured thereto and the tools 20 are thus movable with the die slide 19.

Positioned above the extruding position of the tools 20 and in the housing 15 there is a butt shear 21 including a blade 22 arranged for vertical motion into and out of the area usually occupied by the tools 20, as shown in Figure 2 of the drawings, at such time as the tools 20 and the die slide 19 are moved into the area usually occupied by the gate lock 16, as shown in Figure 2 of the drawings.

A cylinder 23 is mounted on the housing 15 and its rod 24 connects directly with the butt shear 21. A container 25 is movably positioned on the base frame 11 and oppositely disposed brackets 26 on its opposite sides are connected to rods 27 of a pair of horizontally disposed cylinders 28—28. The cylinders 28—28 are mounted on the platen 10 and along the outer opposite sides of the housing 15 heretofore referred to.

In Figures 1 and 2 of the drawings the several parts of the extrusion press are shown in extruding position, it being understood by those skilled in the art that a billet to be extruded is disposed in the container 25 and moved into position adjacent the tools 20 and extruding pressure applied to the billet by the ram 13 so that the extruded metal flows through the tools 20, the horizontal opening in the die slide 19, through the opening defined by the gate lock 16 and through the delivery opening 14.

It will be observed that the housing 15, which is supported on the platen 10, is so arranged that the two-part gate lock 16 is slidably disposed therein adjacent the platen 10 while the butt shear 21 is slidably disposed near the opposite side of the housing 15, and that the die slide 19 and the tools 20 carried thereby are horizontally movable in the housing 15 into and out of the areas occupied by the gate lock 16 and the butt shear 21.

Figure 3:
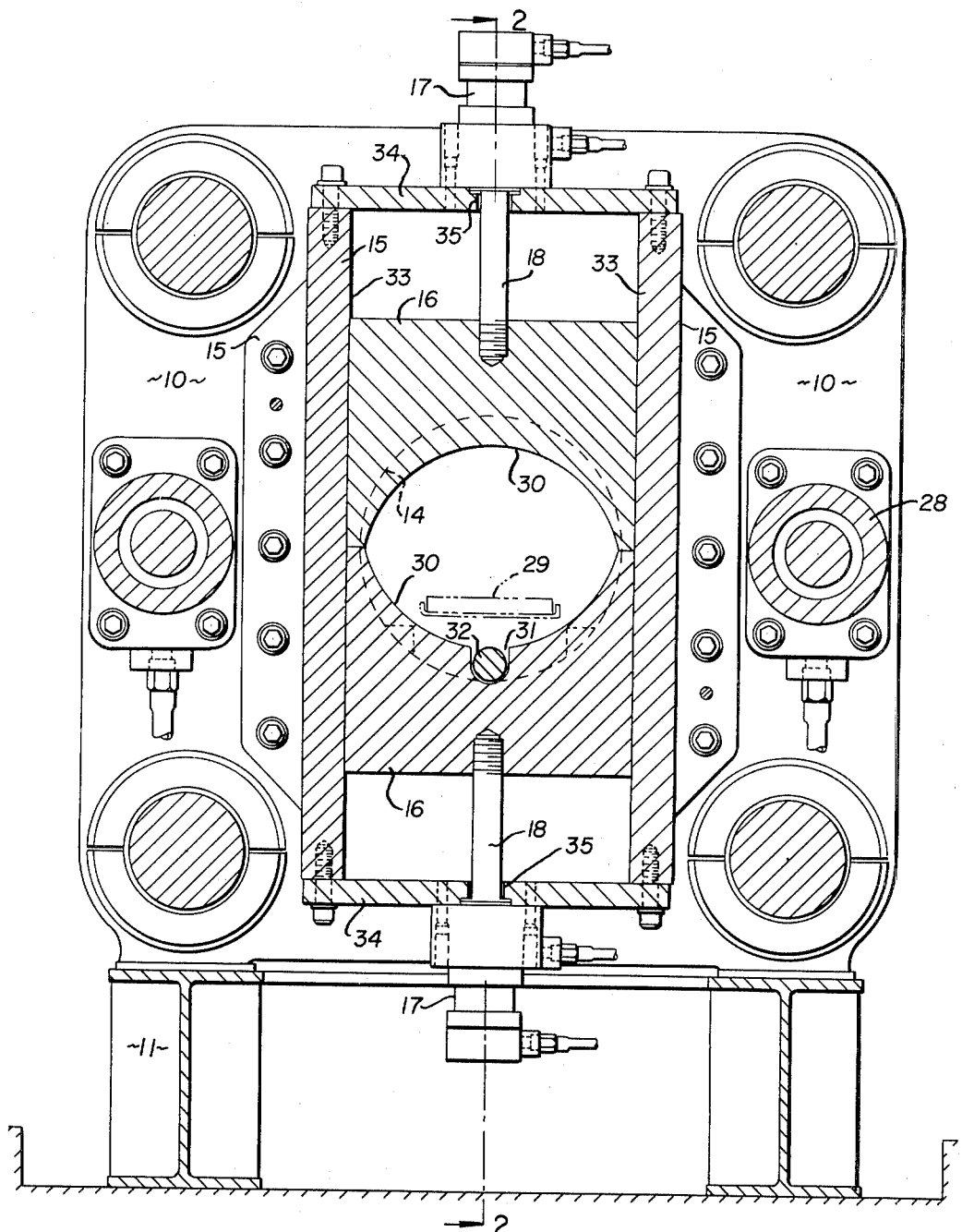
Figure 3 is a vertical section taken on line 3—3 of Figure 2.
Figure 6:
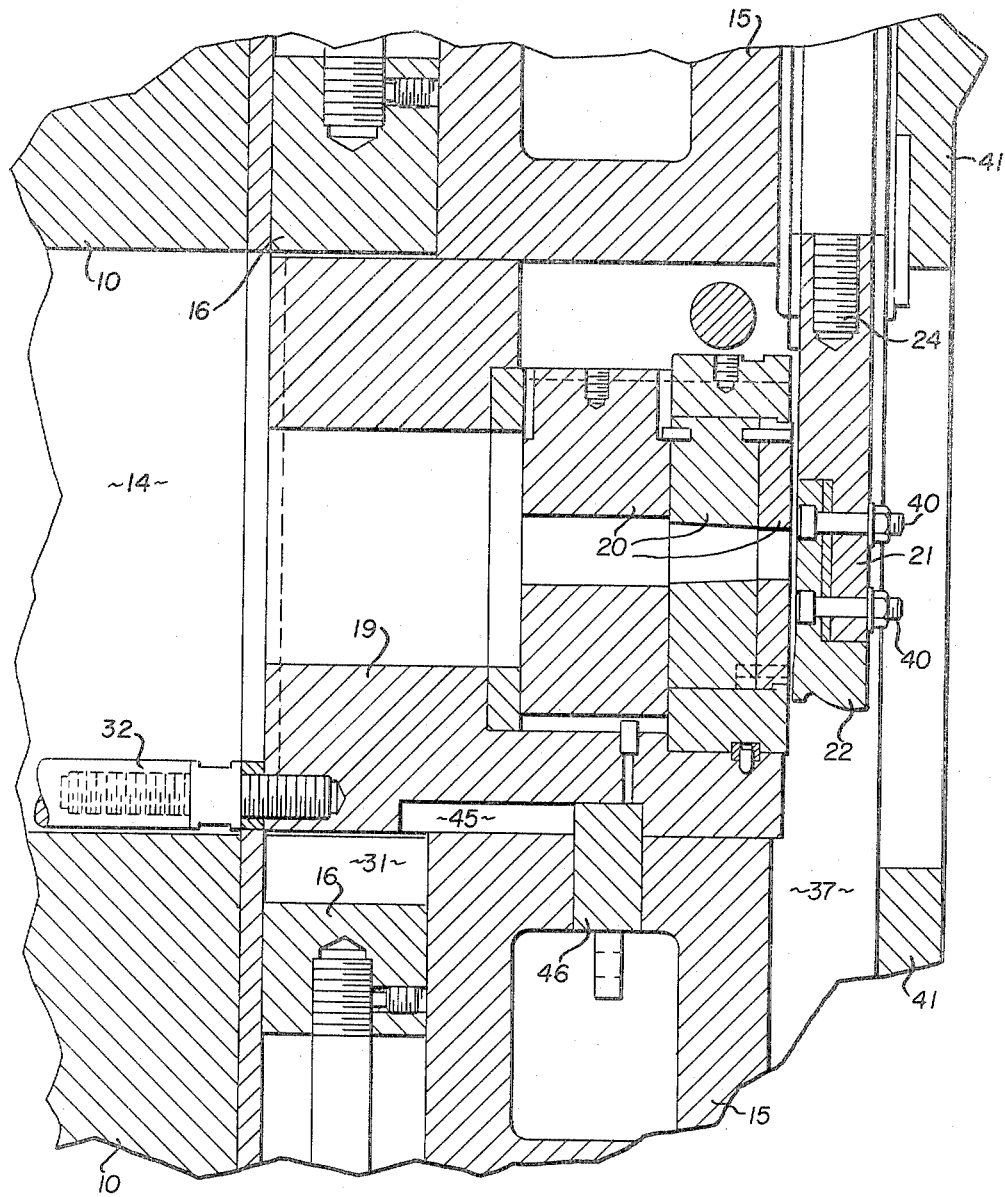
Figure 6 is an enlarged detailed horizontal section of a portion of the extrusion press shown in Figure 2 and illustrating the movable portions thereof in shear position.

By referring now to Figure 3 of the drawings a vertical section through the gate lock 16 may be seen, it being observed that a dotted line indicates the delivery opening 14 and also illustrates one of the extrusion receiving rollers 29. The gate lock 16 is provided with oppositely disposed arcuate sections 30—30, the lower one of which is grooved as at 31 to permit the passage of a rod 32 which is secured to the die slide 19 as best seen in Figures 3 and 6 of the drawings.

It will be observed that the portion of the housing 15 directly adjacent the platen 10 is provided with spaced oppositely disposed vertical guide surfaces 33—33 between which the two-part gate lock 16 is positioned. It will also be seen that the area thus provided by the housing 15 includes space above and below the closed position of the gate lock 16 and into which areas the parts of the gate lock 16 move when retracted by the cylinders 17—17 and rods 18—18 heretofore referred to.

Closure plates 34—34 are secured to the upper and lower surfaces of the housing 15 and span the areas above and below the gate lock 16 and mount the cylinders 17, heretofore referred to. Apertures 35—35 therein pass the rods 18 by which the gate lock 16 is connected with the cylinders 17 for movement thereby.

Figure 4:
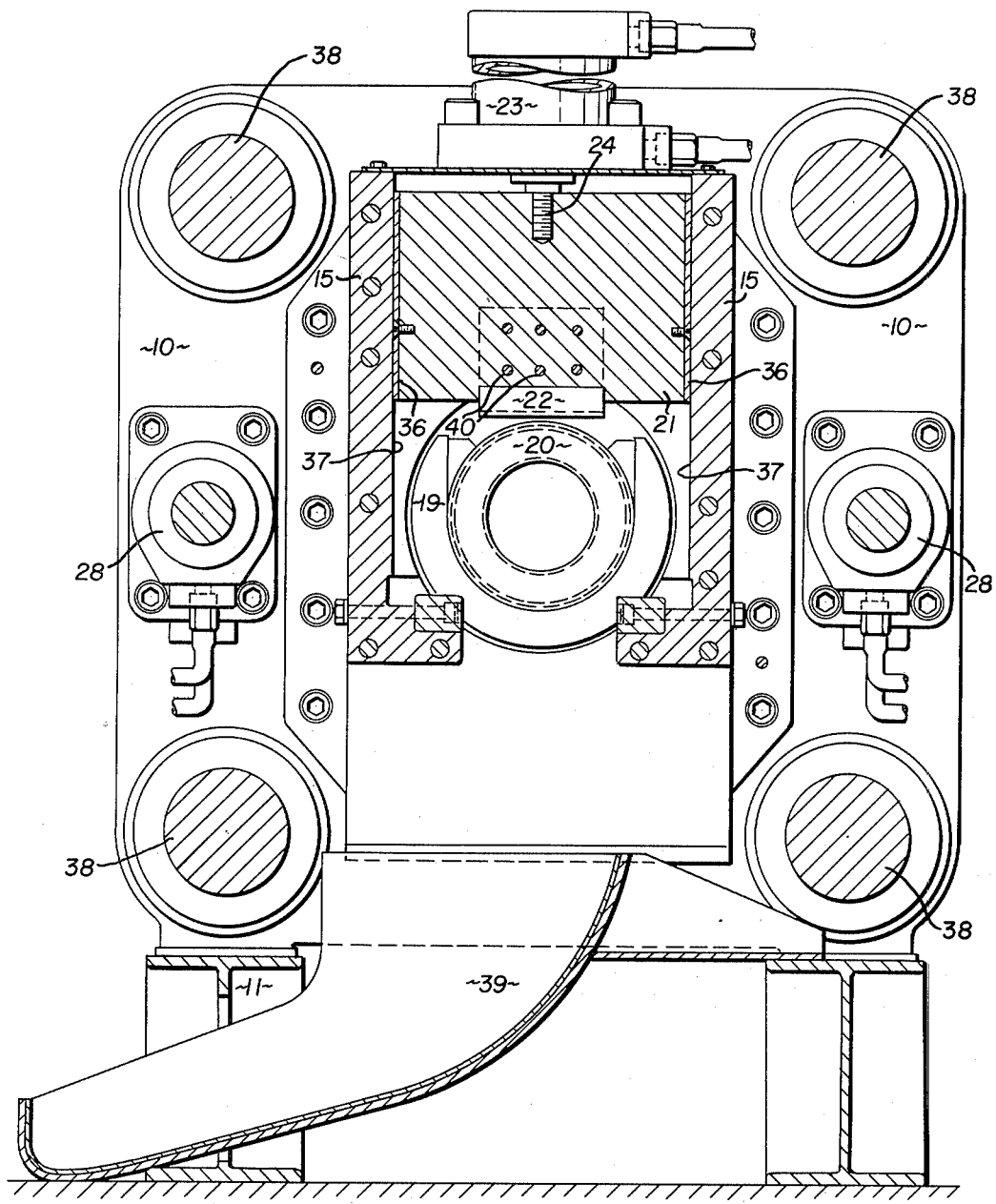
Figure 4 is a vertical section taken on line 4—4 of Figure 2.

By referring to Figure 4 of the drawings a section through the butt shear 21 may be seen, it being observed that the blade 22 is detachably secured to the body of the butt shear 21 and that bearing surfaces 36—36 are secured to the outer sides of the body of the butt shear 21 and slidably engaged with oppositely disposed guide surfaces 37—37 in the housing 15.

In the several figures of the drawings, tie rods 38—38 securely position the platen 10 with respect to the cylinder 12 and ram 13, heretofore referred to, so that pressure exerted by the ram 13 on a billet in the container 25 will be securely opposed by the platen 10.

In Figure 4 of the drawings the tools 20 and die slide 19 may be seen in immediate proximity to the butt shear 21 and the blade 22 thereon and a discharge chute 39 will be seen to be provided for receiving the portion of the billet cut off by the butt shear 21 when the same is actuated by its cylinder 23. The actuating cylinder 23 for the butt shear 21 is mounted on the upper surface of the housing 15 and connected to the butt shear 21 by the rod 24 heretofore referred to. The cylinder 23 is a double acting cylinder and moves the butt shear downwardly in a shearing action and retracts the same upon completion of the shearing stroke.

Figure 5:
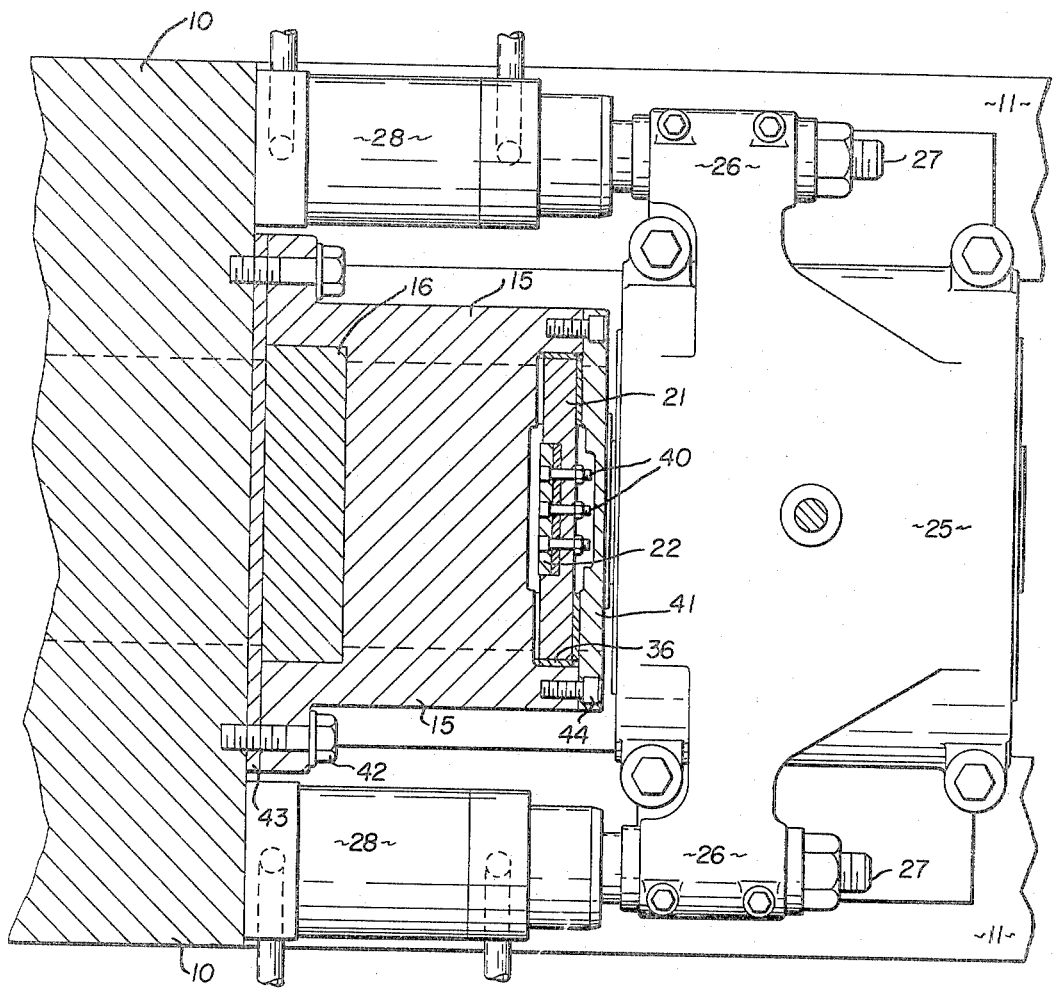
Figure 5 is a horizontal section taken on line 5—5 of Figure 2.

By referring to Figure 5 of the drawings the relative positioning of the gate lock 16 and the butt shear 21 may be seen in the horizontal section disclosed in that figure. The blade 22 and the detail of its fastening to the butt shear body 21 is also clearly illustrated, it being observed that a plurality of bolt and nut assemblies 40 detachably secure the blade 22 to the body of the butt shear 21. It will further be observed that the butt shear is firmly guided by its direct mounting in the housing 15 with an adjacent retaining plate 41 which insures the rigidity of the butt shear 21 during its shearing action.

Still referring to Figure 5 of the drawings, the compact arrangement of the several moving parts of the gate lock and butt shear portions of the extrusion press may be seen with respect to their mounting on the platen 10 of the press. It will be observed that the housing 15 is secured to the platen 10 by fasteners 42 with an intermediate bearing plate 43 against one surface of which the two-part gate lock 16 is reciprocally mounted. The two-part gate lock 16 is movable in a vertical channel formed within the housing 15, as hereinbefore disclosed. The opposite surface of the housing 15 has a vertical channel therein in which the butt shear 21 is disposed and fasteners 44 secure the retainer plate 41 also heretofore referred to. Thus, the entire assembly is supported by and directly attached to the platen 10 which is an essential frame portion of the extrusion press.

By referring now to Figure 6 of the drawings the relative positioning of the two-part gate lock 16, the die slide 19, tools 20 and butt shear 21 may be seen in full down shearing position, it being observed that the gate lock 16 has been moved apart by the cylinders 17, the die slide carrying the tools 20 has been moved to the left of extrusion position and partially into the area previously occupied by the gate lock 16, movement being imparted by the rod 32 and an activating cylinder, not shown.

In this connection it will be observed that the bottom portion of the die slide 19 has a longitudinally extending channel 45 therein in which a guide pin 46 is engaged which is positioned in the housing 15 and extends upwardly into the area of the die slide 19 and acts as a limiting factor with respect to the longitudinal travel permitted the die slide 19 and tools 20 therein.

It will further be observed that the gate lock 16 has moved only a short distance to permit the die slide 19 to move longitudinally and the same has moved only a short distance to permit the butt shear 21 and its blade 22 to move downwardly in a shearing action directly across the face of the tools 20 thereby shearing off the metal being extruded.

It will thus be observed that a very rapid shearing action of the unwanted metal can take place in an extremely short time cycle due to the relatively small degree of motion of the several parts of the extrusion press concerned.

It will be understood by those skilled in the art that the container 25 will be moved away from the tools 20 by the cylinders 28 and over the ram 13 and the dummy block on the head end thereof to effectively strip out the metal in the container 25 immediately prior to the shearing operation.

It will thus be seen that the improvements in and to an extrusion press disclosed herein relate to a novel and unusually efficient positioning and operation of the die slide, the tools therein, the two-part gate lock and the butt shear. The arrangement permits relatively minor movement of these several parts which can be accomplished very rapidly and thus affords an extremely rapid time cycle with respect to a butt shearing operation. Of equal importance is the positioning of the butt shear within the housing mounting the die slide and the two-part gate lock so that the blade of the butt shear is held rigidly throughout a shearing operation.

Those skilled in the art are familiar with the fact that a shearing operation such as herein described actually pushes off the metal rather than cuts the same so that rigidity of the shear blade and body and lack of deflection in the body and associated motivating means is of considerable importance to a rapid and efficient shearing operation. Those skilled in the art will also observe that the construction herein disclosed permits close coupling between the shear body and blade and its actuating cylinder, thus permitting the use of conventional cylinders and rods and providing for the convenient and readily accessible mounting of the same in close proximity to the actual shearing location.

These several improvements serve to speed up the time cycle to the degree that the efficiency of the extrusion press is considerably improved and a practically continuous extrusion operation made possible.

It will thus be seen that the several objects of the invention are met by the extrusion press disclosed herein.

Having thus described my invention, what I claim is:

1. In an extrusion press having a platen, a container for a billet to be extruded and a ram for moving said billet, a housing positioned intermediate said platen and said container and having a longitudinal passageway therethrough, vertical channels formed in the opposite ends of said housing, one adjacent said platen and the other adjacent said container, a two-part vertically movable gate lock disposed in the vertical channel in said housing adjacent said platen, and means on said housing for moving said two-part gate lock toward and away from said passageway, a die slide in said passageway normally abutting said two-part gate lock, tools in said die slide in abutting relation to said container, a butt shear movably positioned in said vertical channel in said housing adjacent said container and normally disposed above said die slide and tools therein, means for moving said die slide and tools in said passageway partially into the area normally occupied by said two-part gate lock when said two-part gate lock is retracted, and means for moving said butt shear downwardly across said tools to shear metal being extruded therethrough.

2. In an extrusion press having a platen, a container for a billet to be extruded and a ram for moving said billet, a housing positioned intermediate said platen and said container and having a longitudinal passageway therethrough, vertical channels formed in the opposite ends of said housing, one adjacent said platen and the other adjacent said container, a two-part vertically movable gate lock disposed in the vertical channel in said housing adjacent said platen and means on said housing for moving each of the parts of said two-part gate lock away from one another and out of said passageway, a die slide in said passageway normally abutting said two-part gate lock, tools in said die slide in abutting relation to said container, a butt shear movably positioned in said vertical channel in said housing adjacent said container and normally disposed above said die slide and tools therein, means for moving said die slide and tools in said passageway partially into the area normally occupied by said two-part gate lock when said two-part gate lock is retracted, and means for moving said butt shear downwardly across said tools to shear metal being extruded therethrough.

3. The improvements in an extrusion press set forth in claim 1 and wherein a bearing plate is disposed between said housing and said platen and against which bearing plate the said two-part gate locks are slidably positioned.

4. The improvements in an extrusion press set forth in claim 1 and wherein guide means are incorporated in said housing acting to limit the movement of said die slide in said passageway.

5. The improvements in an extrusion press set forth in claim 1 and wherein a retainer plate is secured to said housing adjacent the vertical channel therein in which said butt shear is disposed for maintaining said butt shear in rigid alignment in said vertical channel.

6. The improvements in an extrusion press set forth in claim 1 and wherein means are positioned on said platen for moving said container toward and away from said housing.

7. In an extrusion press having a platen, a ram and a container for billets to be extruded, a housing disposed on said platen in opposed relation to said ram and adjacent said container, an axial passageway through said housing and platen in alignment with said ram, a die slide movably positioned in said housing, tools carried by said die slide, means disposed between said housing and said platen normally limiting the movement of said die slide toward said platen and means in said housing on the other side of said die slide with respect to said means limiting the movement thereof for shearing metal engaged in said tools, said die slide and tools normally underlying said shearing means, said means limiting said die slide being movable away from said die slide to permit said die slide to move axially of said passageway whereby said shearing means may be moved transversely of said axial passageway in a shearing operation.

8. The improvements in an extrusion press set forth in claim 7 and wherein secondary guide and limiting means are formed in said housing and engaged with said die slide for limiting the degree of movement thereof in said axial passageway.

9. The improvements in an extrusion press set forth in claim 7 and wherein the means limiting the movement of said die slide toward said platen comprises a pair of oppositely disposed gate locks, each of which has an oppositely disposed arcuate face.

References Cited in the file of this patent

UNITED STATES PATENTS

| | | |
|---|---|---|
| 1,317,238 | Summey | Sept. 30, 1919 |
| 1,935,286 | Born | Nov. 14, 1933 |

FOREIGN PATENTS

| | | |
|---|---|---|
| 408,492 | France | Mar. 28, 1910 |
| 508,165 | Germany | Sept. 25, 1930 |